March 23, 1954

J. H. PULLES 2,673,240

SUBSCRIPTION TELEVISION SYSTEM

Filed Aug. 10, 1951

3 Sheets-Sheet 1

INVENTOR.
JAN H. PULLES
BY Francis W. Crotty
HIS ATTORNEY.

March 23, 1954 J. H. PULLES 2,673,240

SUBSCRIPTION TELEVISION SYSTEM

Filed Aug. 10, 1951 3 Sheets-Sheet 2

INVENTOR.
JAN H. PULLES
BY Francis W. Crotty
HIS ATTORNEY.

March 23, 1954 J. H. PULLES 2,673,240

SUBSCRIPTION TELEVISION SYSTEM

Filed Aug. 10, 1951 3 Sheets-Sheet 3

INVENTOR.
JAN H. PULLES
BY Francis W. Crotty
HIS ATTORNEY.

Patented Mar. 23, 1954

2,673,240

UNITED STATES PATENT OFFICE 2,673,240

SUBSCRIPTION TELEVISION SYSTEM

Jan H. Pulles, Chicago, Ill., assignor to Zenith Radio Corporation, a corporation of Illinois Application August 10, 1951, Serial No. 241,348

4 Claims. (Cl. 178—5.1)

Figure 1:
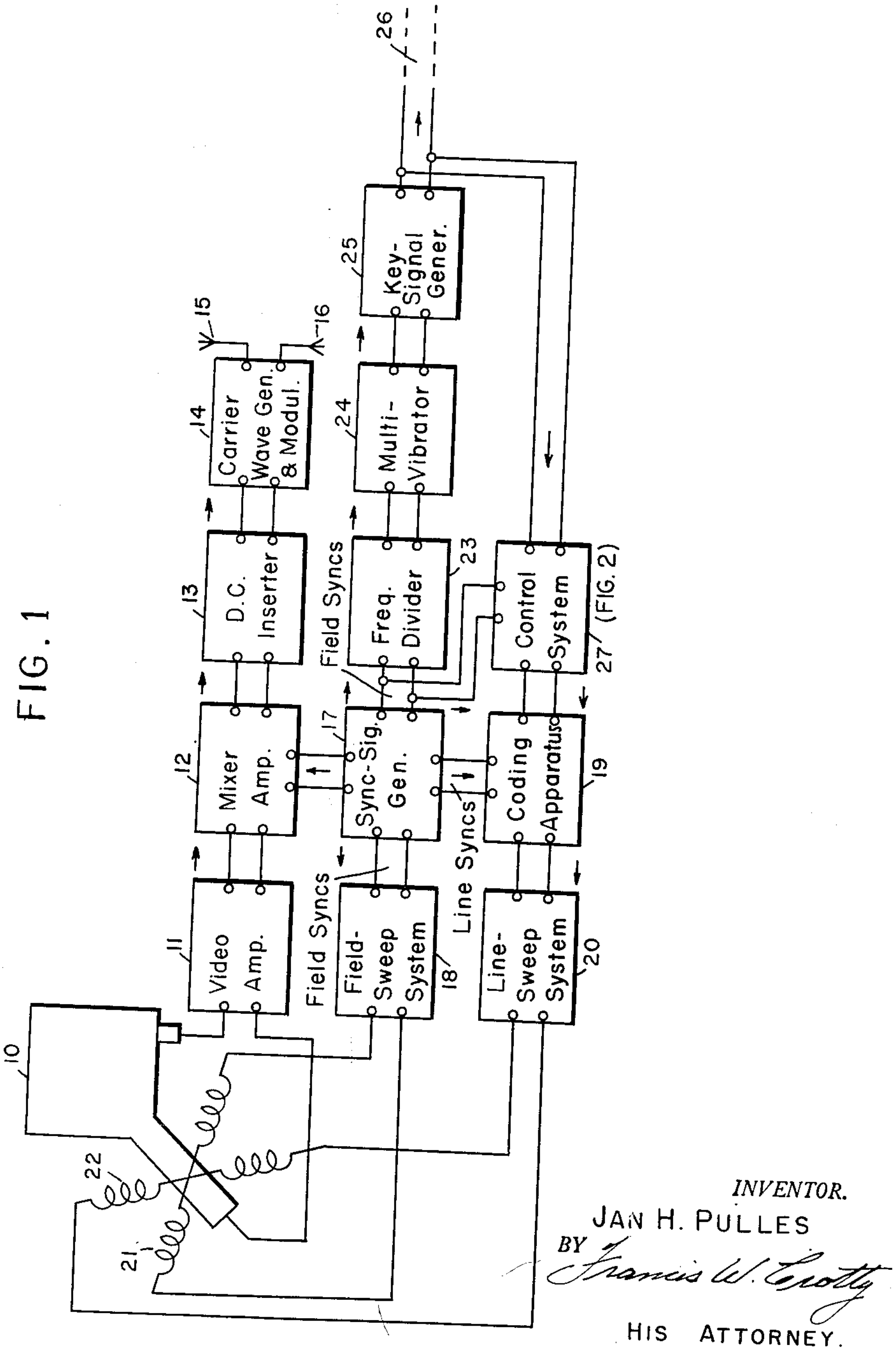

This invention relates to subscription television systems and more particularly to an improved system for controlling the coding or decoding apparatus used in such systems.

Patent 2,547,598, issued April 3, 1951, in the name of Erwin M. Roschke, entitled "Subscription, Image Transmission System and Apparatus," and assigned to the present assignee, discloses and claims a subscription television system in which a coded television signal is transmitted to subscriber receivers and a key signal indicating the coding schedule of the television signal is made available at such receivers, for example by distribution over a line circuit, to enable them to decode and utilize the television signal. In the Roschke system, coding of the television signal is accomplished by coding apparatus which causes an alteration in the timing between its video and synchronizing components during spaced operating intervals, the times of occurrence of these intervals being indicated to subscriber receivers by the key signal. As pointed out in that patent, it is desirable that the timing alterations of the video components occur during retrace intervals to preclude any possibility of distortion in the television signal which might arise should these alterations occur during trace intervals. Moreover, it is desirable that the bursts of key signal supplied over the line circuit precede the actual timing changes by a selected amount so that slight delays suffered by the key signal in the line circuit will have no adverse affect on the coincident operation of the coding apparatus at the transmitter in respect of the decoding apparatus at the various receivers.

In order that mode changes in the television signal may occur during retrace intervals and in order that the key signal bursts may precede these changes, the Roschke system provides that the key-signal generator at the transmitter be turned on for random periods of time beginning and ending during selected field-retrace intervals, a burst of key signal appearing on the line circuit each time the key signal generator is turned on. Each burst of key signal is applied to a control circuit at the transmitter jointly with field-synchronizing pulses, and the control circuit develops a control signal which actuates coding apparatus from a first to a second operating condition during spaced intervals determined by each burst of key signal but beginning and ending during the field-retrace intervals following the initiation and termination of each burst. The coding apparatus is coupled into the scanning system of the transmitter picture-converting device and causes an alteration in the scanning of the device during spaced intervals when the coding apparatus is in its second operating condition to effect coding of the television signal. Similar apparatus is included in each subscriber receiver to produce a compensating change in the scanning of the receiver reproducing device during spaced intervals commencing and terminating during the field-retrace intervals following the initiation and termination of each key signal burst received over the line circuit.

Copending application Serial No. 241,012 entitled "Subscription Television System," filed August 9, 1951 in the name of Carl G. Eilers and assigned to the present assignee discloses and claims a control system suitable for use in the above-described system. This control system responds jointly to the key-signal bursts and to the field-synchronizing pulses to control the encoding apparatus in the manner set forth. The present invention provides a control system similar in some respects to that disclosed by Eilers but functioning in a different manner and using fewer components to accomplish the desired result.

It is, accordingly, an object of this invention to provide an improved control system for controlling encoding apparatus in a subscription television system.

A more specific object of the invention is to provide an improved control system for developing a control signal in response to the joint application of a key-signal burst and a periodic pulse signal, the control signal having pulse components initiated and terminated in time coincidence with pulses of the periodic pulse signal immediately following the beginning and ending of each burst of key signal.

In accordance with the present invention, a control system is provided for actuating the encoding mechanism of a subscription television system under the conjoint control of a key-signal representing the coding schedule of a coded program signal and periodic signal components representing a timing characteristic of that signal. The control system comprises a pair of cross-coupled electron discharge devices constituting a trigger circuit having two stable operating conditions. Each such device has an input circuit as well as an output circuit. A first rectifier is coupled to the input circuit of one of the devices with such polarity as to tend to render the one device conductive in response to a rectified signal and this rectifier is also coupled to the output circuit of the other of the devices with such polarity as to be biased toward a non-conductive condition during intervals when the other device is non-conductive. A second rectifier is coupled to the input circuit of the other electron-discharge device with such polarity as to tend to render this other device conductive in response to a rectified signal and this second rectifier is also coupled to the output circuit of the one device with such polarity as to be biased toward a non-conductive condition during intervals when the one device is non-conductive. Means is provided for applying the periodic signal components to the rectifiers in push-push relation and with such polarity as to tend to render the rectifiers conductive. Finally, the control system comprises means for supplying the key signal to the rectifiers in push-pull relation so that one of the rectifiers actuates the trigger circuit in response to the presence of the key signal and the periodic signal components while the other of the rectifiers actuates the trigger circuit in the presence of the periodic signal components alone.

Figure 2:
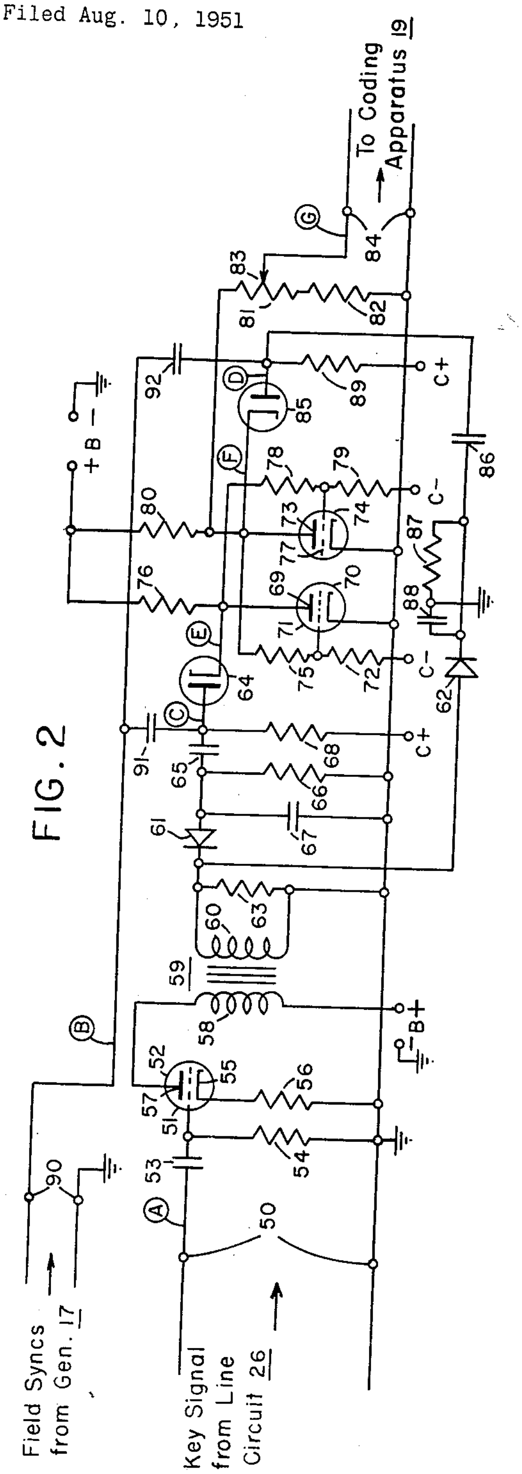
Figure 3:
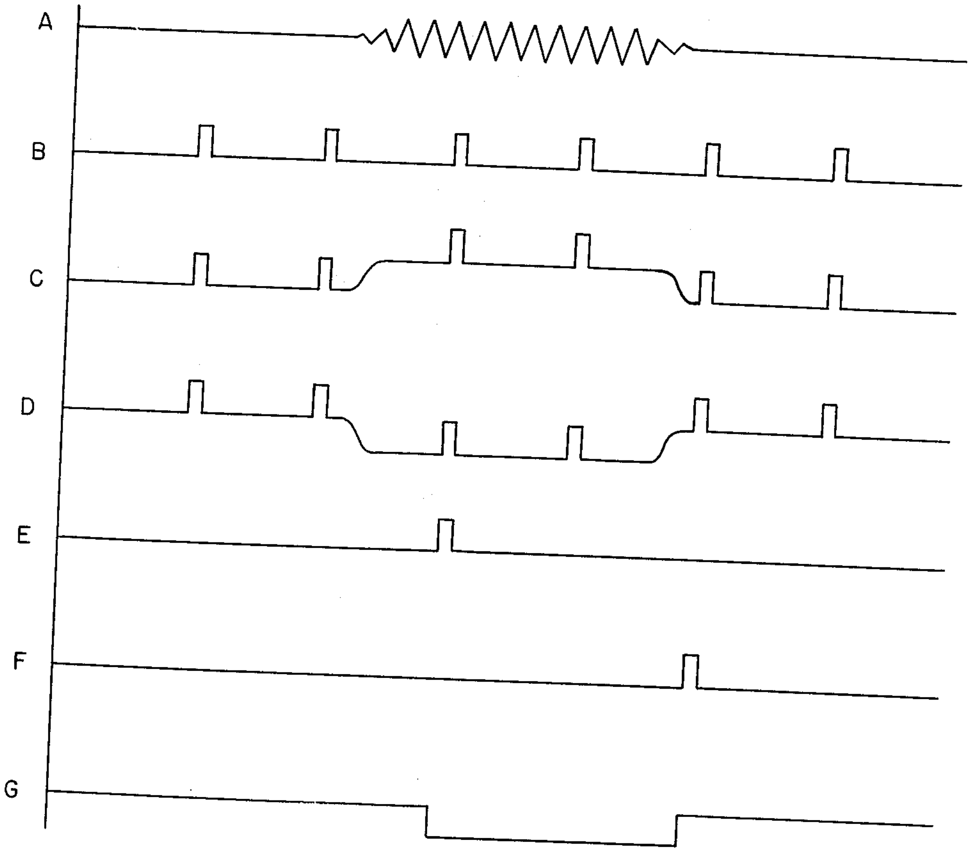
Figure 4:
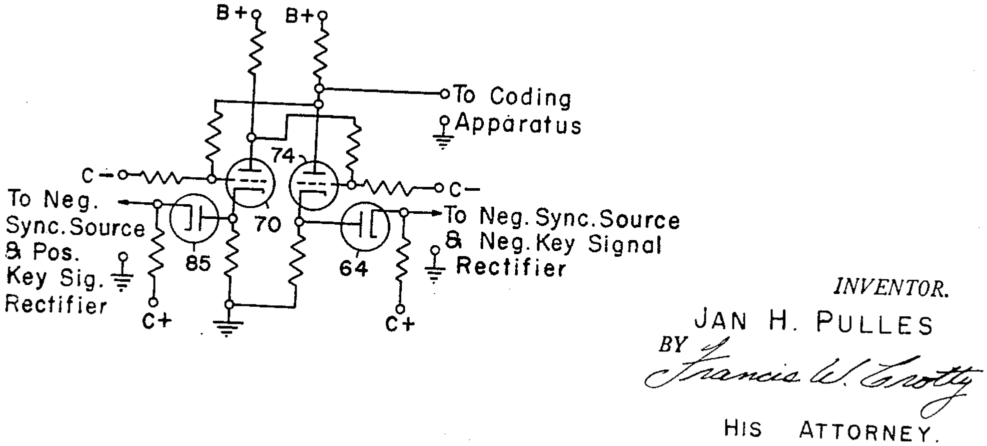

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a subscription television transmitter similar to that disclosed in the aforementioned Roschke patent and incorporating a control system which may be constructed in accordance with the invention, Figure 2 is a detailed representation of the control system of this invention, Figure 3 comprises curves useful in understanding the operation of the control system of Figure 2, and Figure 4 represents another form of control system.

The transmitter of Figure 1 includes a picture-converting device 10 of the cathode-ray type which may be an inconoscope, image orthicon or the like. Device 10 is connected to a video amplifier 11 of one or more stages which, in turn, is connected to a mixer amplifier 12. The output terminals of mixer 12 are connected through a direct-current inserter 13 to a carrier-wave generator and modulator 14 having output terminals coupled to an appropriate antenna circuit 15, 16.

The transmitter further includes a synchronizing-signal generator 17 which supplies line- and field-synchronizing pulses, equalizing pulses, and associated pedestals to mixer amplifier 12. Generator 17 is also connected to a field-sweep system 18 and through coding apparatus 19 to a line-sweep system 20, supplying field-synchronizing pulses to the field-sweep system and line-synchronizing pulses through the coding apparatus to the line-sweep system. The output terminals of sweep systems 18, 20 are connected respectively to field-deflection elements 21 and line-deflection elements 22 associated with device 10.

Synchronizing-signal generator 17 also supplies field-synchronizing pulses to a frequency divider 23 which may be of the random type disclosed and claimed in copending application Serial No. 32,457 filed in the name of Erwin M. Roschke on June 11, 1948, issued March 11, 1952 as Patent 2,588,413, entitled "Random Frequency Dividers" and assigned to the present assignee. The output terminals of frequency divider 23 are connected to a multivibrator 24 which may be of the Eccles-Jordan type. That is, the multivibrator has two stable operating conditions and is triggered between these conditions by succeeding pulses from the frequency divider. The multivibrator is connected to a key-signal generator 25 which, in turn, is connected to a line circuit 26 and to one pair of input terminals of a control system 27 having a further pair of input terminals connected to generator 17 to derive field-synchronizing pulses therefrom and having output terminals connected to coding apparatus 19.

Picture converting device 10 develops a video signal representing a subject scanned by the device, which signal is amplified in video amplifier 11 and applied to mixer 12 wherein it is mixed with the synchronizing and pedestal components from generator 17 to produce a television signal at its output terminals. The television signal is appropriately adjusted as to background level in stage 13, modulated on a picture carrier in unit 14 and radiated to subscriber receivers over antenna 15, 16.

As previously mentioned, coding of the television signal is accomplished by varying during spaced intervals the timing of the video components thereof relative to the synchronizing components. This is achieved by coding apparatus 19 which, upon actuation by control system 27, delays by a selected amount the timing of the line-synchronizing pulses applied to line-sweep system 20. This delay alters the timing of the line-line scansion of device 10 relative to the line-synchronizing pulses applied to mixer 12 from generator 17 during these intervals, and the television signal may be considered effectively coded since it is not intelligibly reproducible in standard commercial television receivers which require an invariable timing of the video components relative to the line-synchronizing components of the received television signal.

The spaced operating intervals during which coding apparatus 19 is actuated are determined in the following fashion: Frequency divider 23 produces pulses which occur in time coincidence with the field-synchronizing pulses but at a frequency which is some random sub-multiple of the field-synchronizing frequency. The successive pulses from frequency divider 23 trigger multivibrator 24 between its first and second stable operating conditions, turning on key-signal generator 25 only during the intervals when the multivibrator is in its second operating condition. Each time the key-signal generator is actuated, it delivers a burst of key signal to line circuit 26 for distribution to subscriber receivers. Since the multivibrator is actuated by pulses occurring in time coincidence with field-synchronizing pulses, the intervals during which it is in its second operating condition begin and end during field-retrace intervals and each burst of key signal similarly is initiated and terminated during field-retrace intervals.

The bursts of key signal are applied to control system 27 which also receives field-synchronizing pulses from generator 17 and develops an actuating signal for coding apparatus 19, the actuating signal having pulse components whose leading and trailing edges occur, respectively, during the field-retrace intervals following the beginning and ending of each burst of key signal on line circuit 26. For the duration of each such pulse component of the actuating signal, coding apparatus 19 delays the line-synchronizing pulses applied to line-sweep system 20 by a selected amount to effect coding of the television signal as previously set forth.

Coding apparatus 19, therefore, changes the mode of operation of the transmitter during spaced time intervals in response to actuation by control system 27. Bursts of key signal are delivered to line circuit 26 indicating the times of actuation of coding apparatus 19, but the actual operation of the coding apparatus takes place during the field-retrace intervals immediately following the initiation and termination of each burst. Therefore, the bursts of key signal on line circuit 26 precede the actual mode changes at the transmitter by a time interval corresponding substantially to a field-trace interval so that slight delays of the key signal in the line circuit do not adversely affect the operation of the system. Moreover, mode changes at the transmitter occur during field-retrace intervals and distortion that could arise in the television signal should such changes occur during trace intervals is obviated.

The control system 27 is constructed in accordance with the present invention and is shown in detail in Figure 2. It includes a pair of input terminals 50 connected to line circuit 26 to obtain the key signal from generator 25. One of the terminals 50 is connected to ground while the other is coupled to the control electrode 51 of an electron-discharge device 52 through a capacitor 53, the control electrode being connected to ground through a grid leak resistor 54. Cathode 55 of device 52 is connected to ground through a resistor 56, and the anode 57 of this device is connected to the positive terminal B+ of a source of unidirectional potential through the primary winding 58 of a transformer 59, the negative terminal of the unidirectional potential source being connected to ground. The secondary winding 60 of transformer 59 has one side connected to ground and its other side connected to a rectifier 61 and to a further rectifier 62 poled oppositely to the first-mentioned rectifier. The secondary winding 60 is shunted by a resistor 63.

Rectifier 61 is coupled to the anode of a unilaterally-conductive device such as a diode 64, through a coupling capacitor 65 and is connected to ground through a load resistor 66 shunted by a capacitor 67. The anode of diode 64 is connected to the positive terminal C+ of a source of biasing potential through a resistor 68, and the cathode of this diode is directly connected to the anode 69 of an electron-discharge device 70. The control electrode 71 of device 70 is connected to the negative terminal C− of a source of bias potential through a resistor 72 and is further connected to the anode 73 of an electron-discharge device 74 through a resistor 75. Anode 69 is connected to the positive terminal B+ of a unidirectional potential source through a resistor 76 and is further connected to the control electrode 77 of device 74 through a resistor 78, the negative terminal of the unidirectional potential source being connected to ground and control electrode 77 being returned to the negative terminal C− of a bias potential source through a resistor 79. Anode 73 is connected to the positive terminal B+ through a resistor 80 and is connected to ground through a pair of series-connected resistors 81, 82. Resistor 81 has a variable tap 83 connected to one of the output terminals 84, the other output terminal being connected to ground. Output terminals 84 are connected to coding apparatus 19 of Figure 1. The cathodes of devices 70, 74 are connected to ground.

Rectifier 62 is coupled to the anode of a unilaterally-conductive device, such as a diode 85, through a coupling capacitor 86 and is connected to ground through a load resistor 87 shunted by a capacitor 88. The anode of diode 85 is connected to the positive terminal C+ of a bias potential source through a resistor 89.

The control system includes a further pair of input terminals 90 which are connected to synchronizing-signal generator 17 to obtain field-synchronizing pulses therefrom. One of the terminals 90 is connected to ground and the other is coupled to the anode of diode 64 through a capacitor 91 and to the anode of diode 85 through a coupling capacitor 92.

The operation of the control system of Figure 2 may best be understood by reference to the curves of Figure 3. When a key signal burst, such as shown in curve A, is applied to terminals 50, it is amplified by discharge device 52. Positive-polarity field-synchronizing pulses shown in curve B are applied to terminals 90. Each key-signal burst is rectified in rectifiers 61, 62 which are poled in opposite senses to produce rectified signals of opposite polarity. Specifically, rectifier 61 produces an output signal having positive-polarity pulse components corresponding to the key-signal bursts while rectifier 62 produces an output signal having negative-polarity pulse components in time coincidence with the positive-polarity components developed by rectifier 61. The output signal from rectifier 61 is applied to the anode of diode 64 conjointly with the positive-polarity field-synchronizing pulses as shown in curve C, whereas the signal from rectifier 62 is impressed on the anode of diode 85 in conjunction with the same field-synchronizing pulses as shown in curve D.

Devices 70 and 74 are connected as a well-known Eccles-Jordan multivibrator. That is, the circuit of these devices has two stable operating conditions and may be triggered from the first to the second condition by positive-polarity pulses applied to control electrode 77 of device 74 and returned to its first condition by pulses of the same polarity applied to control electrode 71 of device 70. If it be assumed initially that the multivibrator is in its first stable condition wherein device 70 is predominantly conductive, the potential of anode 69 is low relative to that of anode 73. The circuit parameters and operating biases are so selected that in this condition the cathode of diode 64 is positive with respect to its anode in the presence of the field-synchronizing pulses alone or in the presence of the positive-polarity components from rectifier 61 considered alone. However, when a field-synchronizing pulse is applied to its anode pedestalled on a positive-pulse component from rectifier 61, diode 64 is rendered conductive and the field-synchronizing pulse is translated therethrough. On the other hand, for this same condition the cathode potential of diode 85 is so positive with respect to its anode that diode 85 is non-conductive to the field-synchronizing pulses from terminals 90 and to the rectified key signal from rectifier 62. Therefore, the first field-synchronizing pulse following the initiation of the rectified signal from rectifier 61 is translated by diode 64 and is applied to anode 69 and to control electrode 77 of device 74 with positive polarity. This pulse triggers the multivibrator to its second stable condition in which device 74 is predominantly conductive.

In this latter operating condition, the cathode of diode 64 is even more positive relative to its anode than in the first-described operating condition. The diode may or may not continue to translate field-synchronizing pulses received within the duration of a key-signal burst; that is immaterial because further positive-polarity pulses applied to control electrode 77 of device 74 have no effect on the operating condition of the multivibrator. On the other hand, the cathode of diode 85 is less positive relative to its anode than in the first stable condition but the negative-polarity output pulse from rectifier 62 prevents diode 85 from translating field-synchronizing pulses received within the duration of the key-signal burst. However, the first field-synchronizing pulse received after the termination of that key-signal burst is translated by diode 85 and is applied to both the anode of device 74 and to control electrode 71 of device 70 with positive polarity. This pulse returns the multivibrator to its first operating condition which is maintained until the reception of the first field-synchronizing pulse succeeding the start of the next key-signal burst.

As shown in curve E, diode 64 preferably translates only the first field-synchronizing pulse following the initiation of a burst of key signal, and as shown in curve F diode 85 translates only the first field-synchronizing pulse following the termination of the key-signal burst. The pulse of curve E triggers the multivibrator to its second stable condition and the pulse of curve F returns it to its first condition. The signal derived across output terminals 84 is shown in curve G and has a negative pulse component occurring during each interval that the multivibrator is in its second condition. Examination of curves A and G shows that each pulse component of the output signal of curve G occurs in response to a burst of key signal, but is initiated and terminated by the field-synchronizing pulses following the beginning and ending of each such burst and, therefore, during field retrace intervals. The actuating signal derived from terminals 84 is applied to the coding apparatus to control it during the field-retrace intervals as previously discussed.

The control system of Figure 4 features a cathode drive for shifting the multivibrator between its two operating conditions. For this case, each tube 70 and 74 has a cathode load impedance and the anodes of diodes 64 and 85 are connected thereto as indicated. The delay bias from source +C applied to the cathode of diode 64 permits this diode to conduct in response to an applied field-synchronizing pulse of negative polarity pedestalled on the negative polarity rectified key-signal burst obtained from rectifier 62. The corresponding bias applied to diode 85, which also receives negative-polarity field-synchronizing pulses and positive-polarity rectified key-signal bursts from rectifier 61, permits this diode to translate the synchronizing pulses in the absence of a key-signal burst. The operation of this control system is generally similar to that of Figure 3.

As described herein, the key signal occurs in bursts because the generator 25 is keyed on or off. Obviously, instead of an on-off relation, the generator output may be amplitude modulated between finite limits to convey the coding information. It will be further understood that the key signal may be angular-velocity modulated to distribute coding information.

The control system of this invention has proved to be highly stable in operation and has been used to advantage in subscription television systems of the type described. Of course, the control system is not limited in use to subscription transmitters but it may also be employed in subscriber receivers to control decoding apparatus therein in time coincidence with the actuation of the coding apparatus at the transmitter.

The control system has an advantage in that a positive control of the multivibrator 70, 74 is provided. Diode 64 is responsive only to the first field-synchronizing pulse following the initiation of a burst of key signal at terminals 50, and diode 85 responds only to the first field-synchronizing pulse following the termination of such burst. For this reason, noise disturbances and other extraneous signals have little effect on the proper operation of the control system. It is apparent that diodes 64, 85 may be replaced by inexpensive devices such as selenium rectifiers or the like.

While a particular embodiment of the invention has been shown and described, modifications may be made and it is intended in the appended claims to cover all such modifications as fall within the true spirit and scope of the invention.

I claim:

1. A control system for actuating the encoding mechanism of a subscription television system under the conjoint control of a key signal representing the coding schedule of a coded program signal and periodic signal components representing a timing characteristic of said signal, said control system comprising: a pair of cross-coupled electron-discharge devices constituting a trigger circuit having two stable operating conditions, each such device having an input circuit and an output circuit; a first rectifier coupled to said input circuit of one of said devices with such polarity as to tend to render said one device conductive in response to a rectified signal and coupled to the output circuit of the other of said devices with such polarity as to be biased toward a non-conductive condition during intervals when said other device is non-conductive; a second rectifier coupled to said input circuit of said other device with such polarity as to tend to render said other device conductive in response to a rectified signal and coupled to the output circuit of said one device with such polarity as to be biased toward a non-conductive condition during intervals when said one device is non-conductive; means for applying said periodic signal components to said rectifiers in push-push relation and with such polarity as to tend to render said rectifiers conductive; and means for supplying said key signal to said rectifiers in push-pull relation so that one of said rectifiers actuates the trigger circuit in response to the presence of said key signal and said periodic signal components while the other of said rectifiers actuates said trigger circuit in the presence of said periodic signal components alone.

2. A control system for actuating the encoding mechanism of a subscription television system under the conjoint control of a key signal representing the coding schedule of a coded program signal and periodic signal components representing a timing characteristic of said signal, said control system comprising: a pair of cross-coupled electron-discharge devices constituting a trigger circuit having two stable operating conditions, each such device having an input circuit and an output circuit; a first rectifier coupled to said input circuit of one of said devices with such polarity as to tend to render said one device conductive in response to a rectified signal; a second rectifier coupled to said input circuit of said other device with such polarity as to tend to render said other device conductive in response to a rectified signal; mans included in said circuits of said cross-coupled devices for developing bias potentials for said rectifiers tending to bias each of said rectifiers toward a non-conductive condition during intervals when a particular one of said devices is non-conductive; means for applying said periodic signal components to said rectifiers in push-push relation and with such polarity as to tend to render said rectifiers conductive; and means for supplying said key signal to said rectifiers in push-pull relation so that one of said rectifiers actuates the trigger circuit in response to the presence of said key signal and said periodic signal components while the other of said rectifiers actuates said trigger circuit in the presence of said periodic signal components alone.

3. A control system for actuating the encoding mechanism of a subscription television system under the conjoint control of a key signal representing the coding schedule of a coded program signal and periodic signal components representing a timing characteristic of said signal, said control system comprising: a pair of cross-coupled electron-discharge devices constituting a trigger circuit having two stable operating conditions, each such device having an input circuit and an output circuit; a first rectifier having a cathode coupled to said input circuit of one of said devices to tend to render said one device conductive in response to a rectified signal and coupled to the output circuit of the other of said devices to be biased toward a non-conductive condition during intervals when said other device is non-conductive; a second rectifier having a cathode coupled to said input circuit of said other device to tend to render said other device conductive in response to a rectified signal and coupled to the output circuit of said one device to be biased toward a non-conductive condition during intervals when said one device is non-conductive; means for applying said periodic signal components to said rectifiers in push-push relation and with such polarity as to tend to render said rectifiers conductive; and means for supplying said key signal to said rectifiers in push-pull relation so that one of said rectifiers actuates the trigger circuit in response to the presence of said key signal and said periodic signal components while the other of said rectifiers actuates said trigger circuit in the presence of said periodic signal components alone.

4. A control system for actuating the encoding mechanism of a subscription television system under the conjoint control of a key signal representing the coding schedule of a coded program signal and periodic signal components representing a timing characteristic of said signal, said control system comprising: a pair of cross-coupled electron-discharge devices constituting a trigger circuit having two stable operating conditions, each such device having an input circuit and an output circuit including a cathode impedance; a first rectifier circuit including a diode and a source of delay-bias potential, the anode of said diode being connected to the high potential terminal of said cathode impedance of one of said devices and the cathode of said diode being connected in series with said source of bias potential to the low potential terminal of said cathode impedance; a second rectifier circuit also including a diode and a source of delay-bias potential, the anode of said second diode being connected to the high potential terminal of said cathode impedance of the other of said cross-coupled devices and the cathode thereof being connected in series with said source of delay-bias potential to the low potential terminal of the same cathode impedance; means for applying said periodic signal components to said rectifiers in push-push relation and with such polarity as to tend to render said rectifiers conductive; and means for supplying said key signal to said rectifiers in push-pull relation so that one of said rectifiers actuates said trigger circuit in response to the presence of said key signal and said periodic signal components while the other of said rectifiers actuates said trigger circuit in the presence of said periodic signal components alone.

JAN H. PULLES.

References Cited in the file of this patent

UNITED STATES PATENTS

| Number | Name | Date |
|---|---|---|
| 2,547,598 | Roschke | Apr. 3, 1951 |